(12) United States Patent  
Kirihara et al.

(10) Patent No.: US 7,421,722 B2
(45) Date of Patent: Sep. 2, 2008

(54) OPTICAL DISC APPARATUS

(75) Inventors: Sojiro Kirihara, Kawasaki (JP); Yoshiyuki Tanaka, Kawasaki (JP); Shinya Tsubota, Mito (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 361 days.

(21) Appl. No.: 11/367,416

(22) Filed: Mar. 6, 2006

(65) Prior Publication Data

US 2007/0083877 A1    Apr. 12, 2007

(30) Foreign Application Priority Data

Oct. 12, 2005    (JP)    ............................ P2005-297232

(51) Int. Cl.  
*G11B 7/085*    (2006.01)
(52) U.S. Cl. ..................................... 720/695
(58) Field of Classification Search ................. 720/695, 720/605, 652, 630, 607, 610, 626  
See application file for complete search history.

(56) References Cited

U.S. PATENT DOCUMENTS

2007/0083876 A1*    4/2007    Kirihara et al. ............. 720/605

FOREIGN PATENT DOCUMENTS

JP    2002-352498    12/2002
JP    2005-085449    3/2005

* cited by examiner

*Primary Examiner*—Allen T Cao  
(74) *Attorney, Agent, or Firm*—Antonelli, Terry, Stout & Kraus, LLP.

(57) ABSTRACT

An optical disc apparatus includes position restricting component for restricting the position of a unit mechanism portion in a disc plane direction when the unit mechanism portion is in a raised state. The position restricting component includes a first portion that restricts the position of a base of the unit mechanism portion when the base is at a height position for write or read of information to or from an optical disc and a second portion that cancels the position restriction on the base of the unit mechanism portion in the disc plane direction or makes the position restriction easier than in the first portion when the base is at a height position corresponding to a chucked portion of the optical disc onto the turntable. At the height position where the optical disc is chucked the position restricting component makes the turntable displaceable in the disc plane direction so that the axis of the turntable becomes nearly coincident with the center of a center hole formed in the optical disc.

11 Claims, 6 Drawing Sheets

OPTICAL DISC APPARATUS

CLAIM OF PRIORITY

The present application claims priority from Japanese application serial No. P2005-297232, filed on Oct. 12, 2005, the content of which is hereby incorporated by reference into this application.

BACKGROUND OF THE INVENTION

1. Technical Field of the Invention

The present invention relates to an optical disc apparatus and particularly to a technique for chucking an optical disc.

2. Description of the Related Art

Techniques relating to the present invention are disclosed in, e.g., Japanese Patent Laid-open Nos. 2005-85449 and 2002-352498. Japanese Patent Laid-open No. 2005-85449 discloses a disc drive wherein a bent piece 102 on the side of a bottom case 4 is formed with a vertical slit 103 adapted to engage and support a pivot shaft (second pivot shaft) 105 secured to a base (base of a unit mechanism portion) 31. In Japanese Patent Laid-open No. 2002-352498 discloses a disc drive wherein a traverse (unit mechanism portion) 30 is raised and lowered under positional control by a first cam mechanism 41, a second cam mechanism 51 and a third cam mechanism 52. The first cam mechanism 41 is configured such that a cam pin 36 fixed to a base member (base member of the unit mechanism portion) 16 is slidably engaged with a slot formed in the surface of a main slider 40. The second cam mechanism 51 is configured such that a cam pin 37 fixed to the base member (base member of the unit mechanism portion) 16 is slidably engaged with a slot formed in the surface of a sub-slider 50 disposed nearly perpendicularly to the main slider 40. The third cam mechanism 52 is configured such that a cam pin 53 fixed to the base member (base member of the unit mechanism portion) 16 is slidably engaged with two slots of the same shape formed in both ends of the sub-slider 50.

However, of the conventional techniques described in the above patent documents, the technique described in Japanese Patent Laid-open No. 2005-85449 is considered such that the vertical slit 103 adapted to engage the pivot shaft (second pivot shaft) 105 is uniform in width. Thus, the construction disclosed therein is not a construction wherein the position restriction in the disc plane direction of the pivot shaft (second pivot shaft) 105 at a disc chucked height position is eased or cancelled. Therefore, when the center axis of a turntable is offset relative to the center of a center hole (hereinafter referred to as the "disc center hole") of the disc, the chucking of the disc onto the turntable may be unlikely to be performed in the normal manner. According to the construction disclosed in Japanese Patent Laid-open No. 2002-352498, the first, second and third cam mechanisms are used as cam mechanisms, and the cam pin is engaged with the slot formed in the slider surface. Therefore, the structure of a raising/lowering mechanism having a position restricting function for the traverse (unit mechanism portion) in the disc plane direction is complicated and is liable to increase in size.

In view of the above-mentioned conventional circumstances the problem to be solved by the present invention is to permit a normal chucking operation to be performed in an optical disc apparatus even in the case where the axis of the turntable is offset relative to the disc center hole with a simple, small-sized and thin device configuration.

It is an object of the present invention to solve the above-mentioned problem and provide a technique capable of improving reliability in chucking an optical disc in an optical drive.

SUMMARY OF THE INVENTION

The present invention is a technique that has solved the above-mentioned problem.

According to the present invention, in an optical disc apparatus, position restricting component for restricting the position in a disc plane direction at the time of raising or lowering a unit mechanism portion includes a first portion that restricts the position of a base of the unit mechanism portion in the disc plane direction when the base of the unit mechanism portion lies at a height position for write or read of information with respect to an optical disc and a second portion that cancels the position restriction in the disc plane direction of the base or makes the position restriction easier than in the first portion when the base lies at a height position where the disc is chucked onto the turntable.

According to the present invention it is possible to improve the reliability of disc chucking in an optical disc apparatus.

DETAILED DESCRIPTION OF THE PREFERRED EMBODIMENTS

An embodiment of the present invention will be described hereinunder with reference to the drawings.

Figure 1:
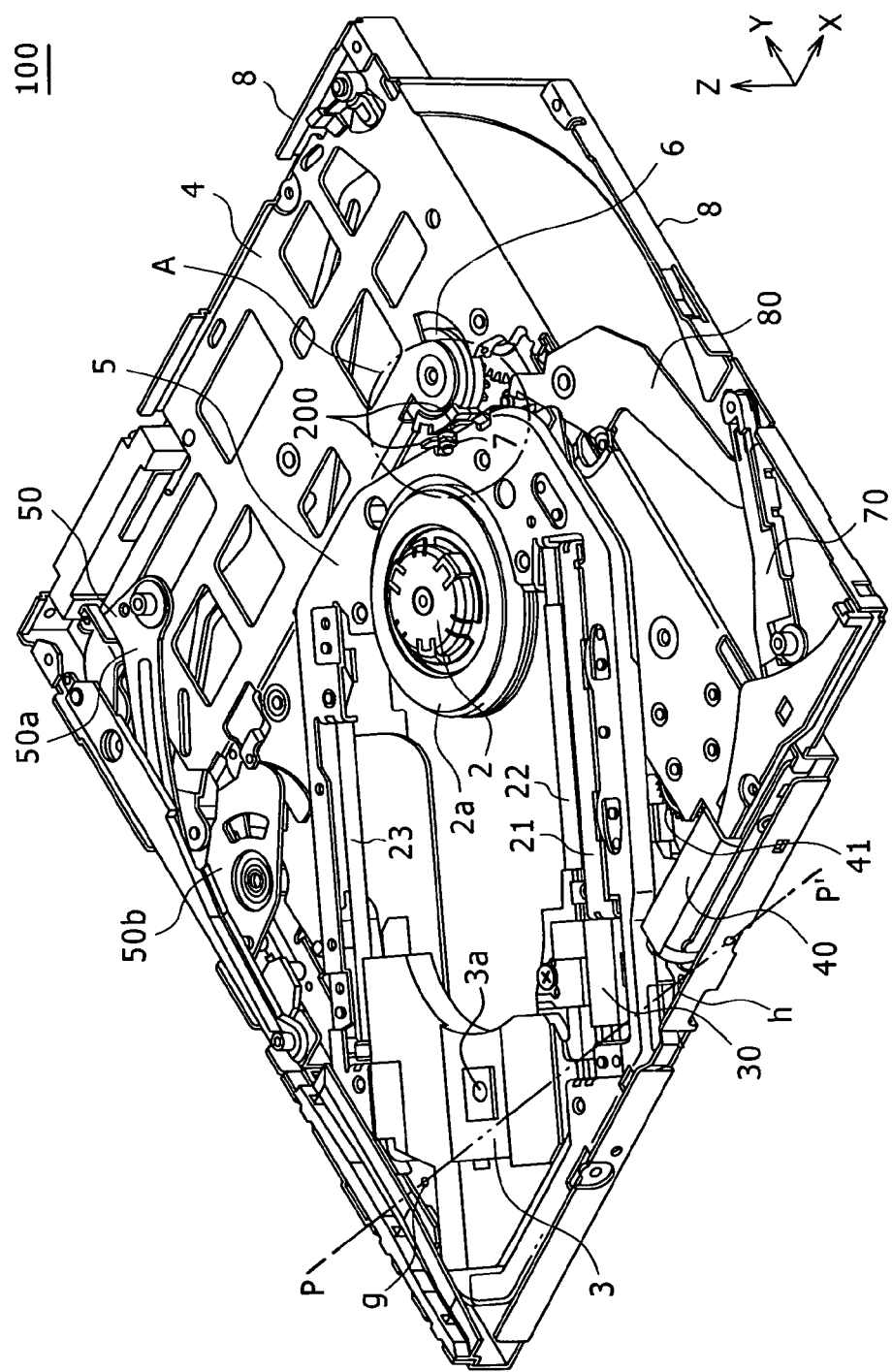
FIG. 1 illustrates the entire construction of an optical disc apparatus according to an embodiment of the present invention.
Figure 2:
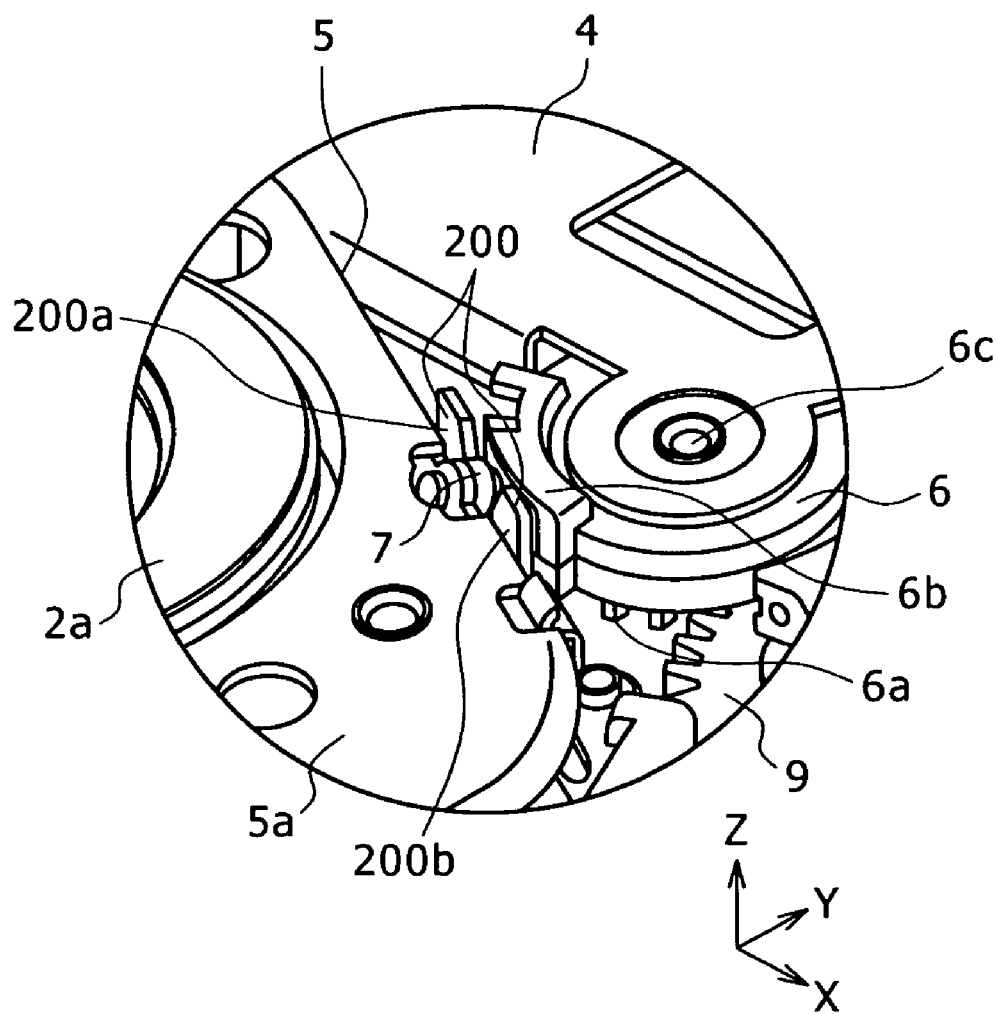
FIG. 2 is an enlarged view of portion A in FIG. 1.
Figure 3:
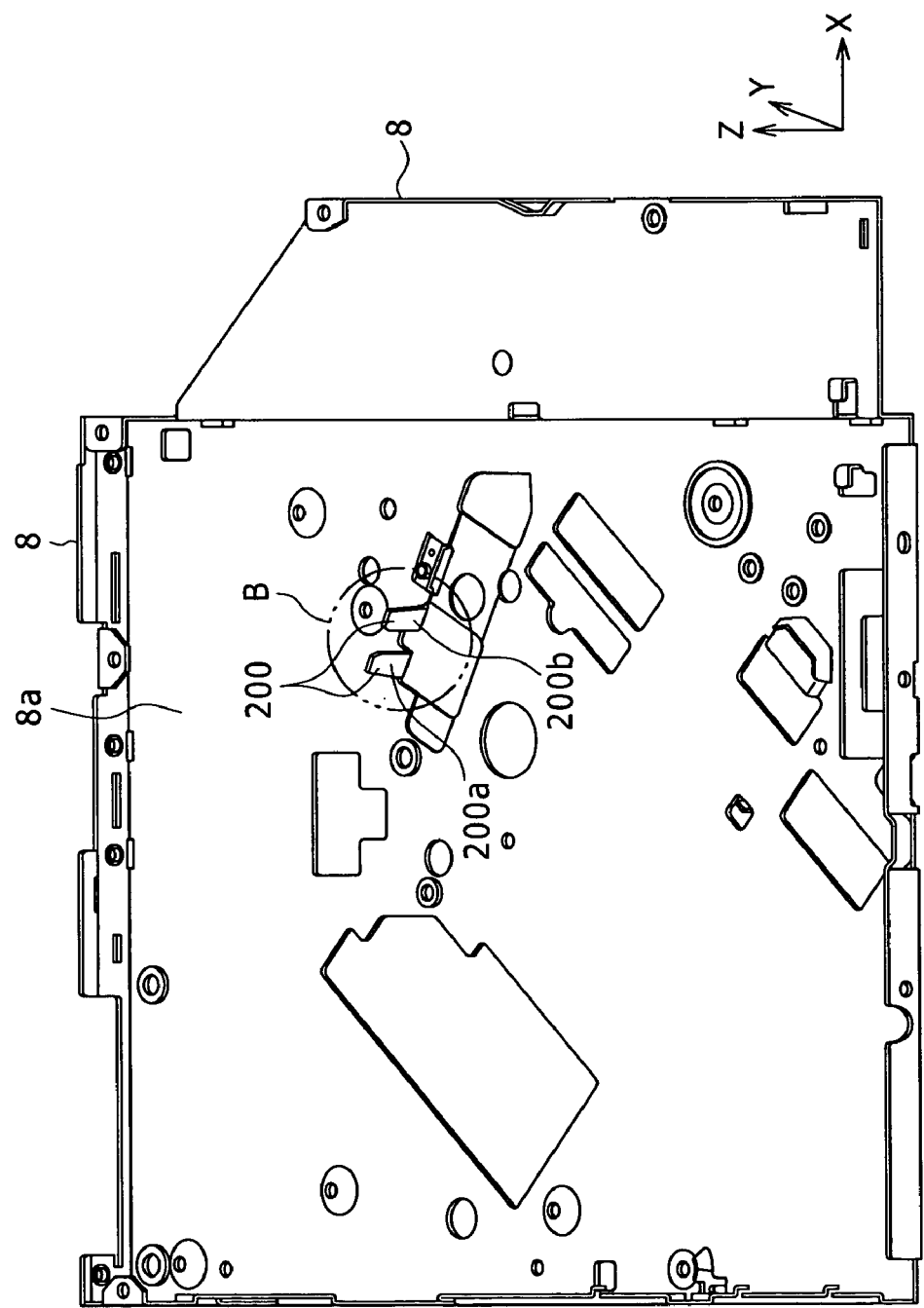
FIG. 3 illustrates an inner surface-side construction of a bottom case in the optical disc apparatus of FIG. 1.
Figure 4:
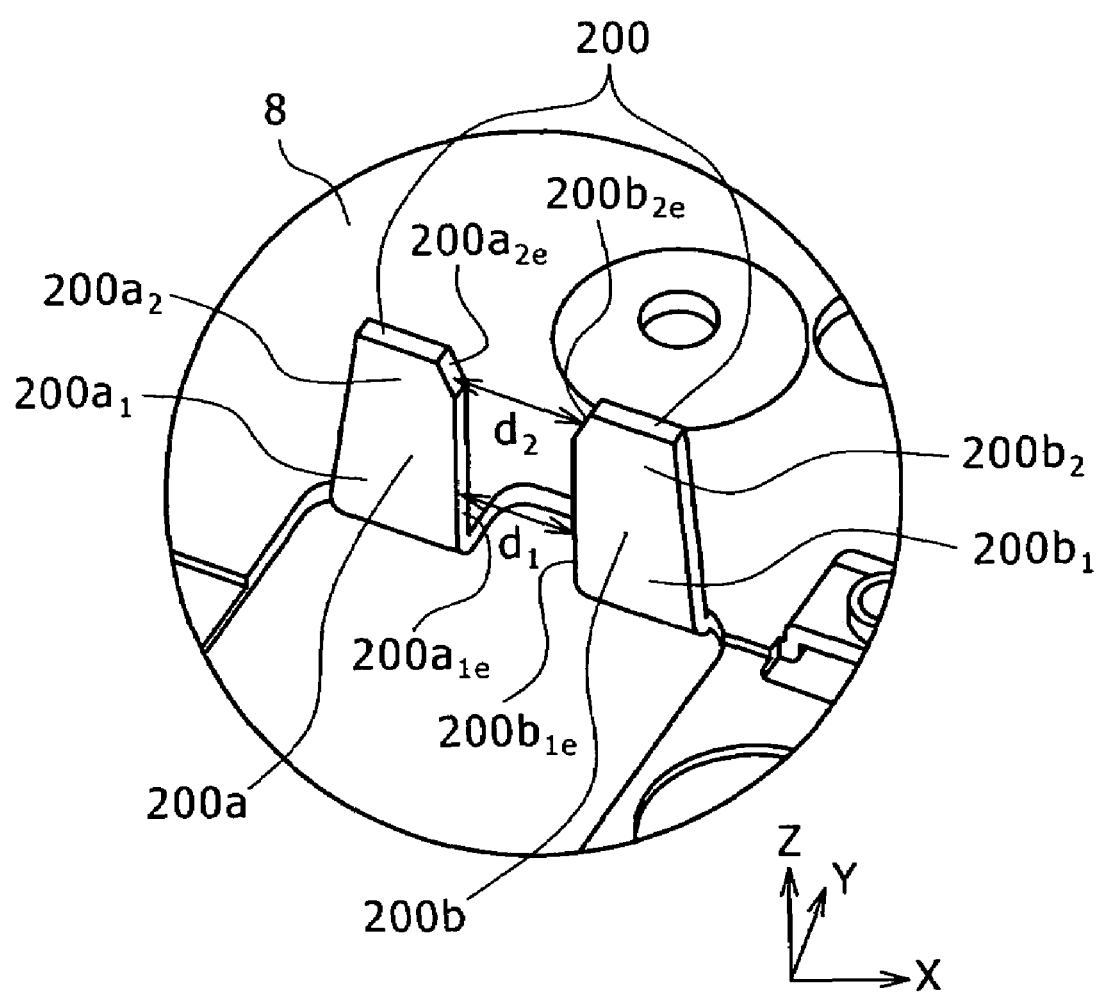
FIG. 4 is an enlarged view showing the construction of portion B of the bottom case inner surface in FIG. 3.

FIGS. 1 to 6 illustrate an embodiment of the present invention. FIG. 1 is an entire construction diagram of a slot-in type (a type of loading and unloading a disc without using a tray) optical disc apparatus according to an embodiment of the present invention. FIG. 2 is an enlarged diagram showing the construction of portion A in FIG. 1. FIG. 3 illustrates an inner surface-side construction of a bottom case in the optical disc apparatus of FIG. 1. FIG. 4 is an enlarged diagram showing the construction of portion B of the bottom case inner surface in FIG. 3. FIG. 5 is a sectional view of a raising/lowering mechanism in the optical disc apparatus of FIG. 1, showing a state in which a unit mechanism portion lies at a raised position for chucking a disc. FIG. 6 is a sectional view of the raising/lowering mechanism in the optical disc apparatus of FIG. 1, showing a state in which the unit mechanism portion has lowered to a position permitting write or read operation. In FIGS. 1 to 6, the same components are identified by the same reference numerals and the same coordinate axes are used.

FIG. 1 illustrates the construction of a surface side (disc resting side) of the optical disc apparatus embodying the present invention.

In FIG. 1, reference numeral 100 denotes the optical disc apparatus. Numeral 2 denotes a disc motor for rotating an optical disc (not shown) and numeral 2a denotes a turntable for resting the optical disc thereon,. Numeral 3 denotes an optical pickup and numeral 3a denotes an objective lens. Numeral 4 denotes a chassis as a first base which is a base of the optical disc apparatus. Numeral 5 denotes a unit mechanism portion in which the disc motor 2 and the optical pickup 3 are disposed. Numeral 5a denotes a unit mechanism deck member as a second base which is a support base for the unit mechanism portion 5, the unit mechanism deck member 5a being pivotable about a fulcrum with respect to the chassis 4 and with the disc motor 2 and the optical pickup 3 being mounted thereon, numeral 6 denotes a cam mechanism for moving the unit mechanism deck member 5a pivotally about a fulcrum and raising and lowering it with respect to the chassis 4. Numeral 7 denotes a cam pin provided on the side of the unit mechanism deck member 5a and engaged with a cam surface of the cam mechanism 6. Numeral 8 denotes a bottom case which covers a back side of the optical disc apparatus 100. Numeral 21 denotes a lead screw member formed with treads on the surface thereof and causing the optical pickup 3 to move in a substantially radial direction of the optical disc (not shown) by rotation of the threads. Numerals 22 and 23 denote guide members provided parallel with the lead screw member 21 to guide the movement of the optical pickup 3. Numeral 30 denotes a feed motor for drivingly rotating the lead screw member 21 and numeral 40 denotes a loading motor which generates a driving force to move the optical disc for loading or unloading. Numeral 41 denotes a gear train for transfer of the driving force from the loading motor 40 to a load side. Numeral 50 denotes an arm member which performs the transfer of the driving force for disc inserting and discharging operations when the optical disc is inserted in a Y-axis direction into the body of the optical disc apparatus from the side of a front panel (not shown) or when the optical disc is discharged from the interior of the optical disc apparatus body to the front panel side. Numeral 50a denotes an arm portion of the arm member 50 and numeral 50b denotes an arm support portion for supporting the arm portion 50a pivotably about a fulcrum. Numeral 70 denotes a disc slot arm member for pulling the optical disc that has been inserted from the front panel side further into the body of the optical disc apparatus. Numeral 80 denotes a sub-lever member. Symbols g and h denote fulcrums of the unit mechanism deck member 5a and P-P' denotes a straight line ("fulcrum line" hereinafter) passing through the fulcrums g and h. Lastly, numeral 200 denotes a pair of position restricting lugs as position restricting component formed in the shape of lugs at positions that sandwich the outer periphery of the cam pin 7 on both sides of the am pin 7 to restrict the position in the disc plane direction of the unit mechanism portion 5.

On the unit mechanism deck member 5a as the second base are mounted not only the disc motor 2 and the optical pickup 3 but also the lead screw member 21, the guide members 22, 23 and the feed motor 30, constituting the unit mechanism portion 5. The cam mechanism 6 comprises a columnar body and a cam groove with a cam surface formed on the outer periphery of the columnar body. The cam mechanism 6 is mounted pivotably within the range of an orthographic projection area (an orthographically projected circular area of the circular plane of the optical disc) of the optical disc chucked onto the turntable 2a. A pivot shaft of the cam mechanism 6 extends in substantially the same direction (Z-axis direction) as a rotary shaft of the disc motor 2 and the cam groove has a cam surface formed around and in the direction of the said pivot shaft (Z-axis direction). A tip of the cam pin 7 is inserted into the cam groove and comes into engagement with the cam surface. The cam mechanism 6 and the cam pin 7 constitute a raising/lowering mechanism for moving the unit mechanism deck member 5a pivotally about the fulcrums g and h, that is, about the fulcrum line P-P', and raising and lowering it with respect to the chassis 4.

The position restricting lugs 200 restrict a displacement of the cam pin 7 in the disc plane direction on both sides of the cam pin 7, thereby restricting the position of the unit mechanism deck member 5a in the disc plane direction and hence of the unit mechanism portion 5. The position restricting lugs 200 each include a first portion and a second portion. The first portion restricts the position of the cam pin 7 in the disc plane direction when the unit mechanism deck member 5a lies at a height position (=first height position) for write or read of information to or from the optical disc. The second portion cancels the position restriction on the cam pin 7 in the disc plane direction or makes the position restriction easier than in the first portion when the unit mechanism deck member 5a lies at a height position (=second height position) corresponding to a chucked position of the optical disc onto the turntable 2a. In the first portions of the position restricting lugs 200, the spacing between the lugs is narrowed relatively to decrease the dimensional margin for the outside diameter of the cam pin 7. In addition, in the second portions the lug-to-lug spacing is widened relatively to increase the dimensional margin for the outside diameter of the cam-pin 7 in comparison with the first portion. The surface side of the optical disc apparatus 100 is covered with a top cover member (not shown). In the optical disc apparatus 100 of this embodiment, the outside diameter of the cam pin 7 is about $2.5 \times 10^{-3}$ m, a dimensional margin for the outside diameter of the cam pin 7 in the first portions of the position restricting lugs 200 is about $0.1 \times 10^{-3}$ m, and that in the second portions is not less than about $0.5 \times 10^{-3}$ m. Further, an overall thickness of the optical disc apparatus (the distance between an outer surface of the top cover member and that of the bottom case 8) is not larger than $9.5 \times 10^{-3}$ m.

In the following description the same components as in FIG. 1 will be identified by the same reference numerals as in FIG. 1.

FIG. 2 is an enlarged diagram showing the construction of portion A in FIG. 1.

In FIG. 2, numeral 6a denotes a driven gear as a driven portion of the cam mechanism 6, the driven gear 6a being mounted within the cam mechanism 6 and concentrically on the pivot shaft of the cam mechanism. Numeral 6b denotes a cam surface-formed portion within the cam mechanism 6 and numeral 6c denotes the pivot shaft of the cam mechanism 6. Numeral 9 denotes a driving gear engaged with the driven gear 6a of the cam mechanism 6 to transmit a driving force for moving the cam mechanism 6 pivotally around the pivot shaft 6c to the driven gear 6a. Numerals 200a and 200b each denote a one-side lug in the pair of position restricting lugs 200. Other reference numerals are the same as in FIG. 1. The cam pin 7 is disposed on a straight line joining the center (pivot center) of the pivot shaft 6c of the cam mechanism 6 and the unit mechanism deck member 5a. The pair of position restricting lugs 200 comprise lugs 200a and 200b disposed on both sides of the cam pin 7. The lugs 200a and 200b restrict the movement of the cam pin 7 in the disc plane direction and restrict the position, in the disc plane direction, of the unit mechanism portion 5 including the unit mechanism deck member 5a. The lugs 200a and 200b are provided integrally with a plane portion of the bottom case 8.

For example, in loading of the optical disc, when the optical disc is inserted into the body of the optical disc apparatus up to a predetermined position, the loading motor 40 starts to rotate and its rotational driving force is transmitted to the transfer gear train 41, further transmitted to a lever member (not shown) connected to the gear train 41 to rotate the driving gear 9 in a cam drive section about a pivot shaft thereof. The pivoting of the driving gear 9 causes the driven gear 6a to rotate, whereby the cam mechanism 6 is moved pivotally about the pivot shaft 6c. With this pivotal movement of the cam mechanism 6, the cam surface moves relative to the cam pin 7 and its height position in Z-axis direction becomes high. As a result, the cam pin 7 rises in the pivot shaft direction of the cam mechanism 6, i.e., in Z-axis direction, along the curved line of the cam surface. With the rising motion in Z-axis direction of the cam pin 7, the unit mechanism deck member 5a moves pivotally about the fulcrums g and h, i.e., about the fulcrum line P-P', and causes the disc motor 2 and the turntable 2a on the unit mechanism deck member 5a to rise relative to the chassis 4. With the rising motion of the turntable 2a, the optical disc is raised into abutment against the inner surface of the top cover and is chucked in this state. During the chucking, i.e., during the period from the start until the end of the chucking, the cam pin 7 brings the unit mechanism deck member 5a to the second position, i.e., a height position where the optical disc is chucked onto the turntable 2a, within the range from a position just before a maximum point in the Z-axis direction of the cam surface up to the position of the maximum point. When the unit deck member 5a is at the second height position, the cam pin 7 lies at a height position sandwiched in between the second portions of the pair of position restricting lugs 200, i.e., the lugs 200a and 200b, and the position restriction in the disc plane direction by the position restricting lugs 200 is in a cancelled or eased state. With this state, the cam pin 7 has a high degree of freedom of movement in the disc plane direction. Therefore, even if the axis of the turntable 2a on the unit mechanism deck member 5a is offset from the central position of the center hole of the optical disc, the axis of the turntable 2a is made nearly coincident with the center of the center hole of the optical disc by an inclined side shape of the turntable 2a and an upward movement of the turntable 2a caused by rising of the unit mechanism deck member 5a. This makes it possible to effect the normal disc chucking operation.

After the end of the chucking operation, the cam mechanism 6 further pivots in the same direction, whereby the cam pin 7 lowers in the Z-axis direction past the maximum point in the Z-axis direction of the cam surface and stops at a predetermined height position. At this height position the optical disc becomes rotatable by the disc motor 2 and the optical disc apparatus assumes a state permitting write or read operation. In this state, the cam pin 7 brings the unit mechanism deck member 5a to the first height position, i.e., a height position which permits the optical disc apparatus to perform write or read operation. When the unit mechanism deck member 5a is at the first height position, the cam pin 7 is at a height position sandwiched in between the first portions of the pair of position restricting lugs 200, i.e., lugs 200a and 200b. This state is a position-restricted state in the disc plane direction by the position restricting lugs 200.

FIG. 3 illustrates a construction example on the inner surface side of the bottom case 8 in the optical disc apparatus of FIG. 1.

In FIG. 3, part of a plane portion 8a included in the bottom case 8 on the surface side thereof is bent to integrally form the pair of lugs 200a and 200b of the position restricting lugs 200.

FIG. 4 is an enlarged view of portion B in the inner surface-side construction of the bottom case 8 of FIG. 3.

In FIG. 4, numerals $200a_1$ and $200b_1$ denote first portions of the lugs 200a and 200b respectively, and numerals $200a_2$ and $200b_2$ denote second portions of the lugs 200a and 200b respectively. Numeral $200a_{1e}$ denotes an end face of the first portion $200a_1$, and numeral $200a_{2e}$ denotes an end face of the second portion $200a_2$. Numeral $200b_{1e}$ denotes an end face of the first portion $200b_1$, and numerals $200b_{2e}$ denotes an end face of the second portion $200b_2$. Symbol $d_1$ denotes the distance between the end faces $20a_{1e}$ and $200b_{1e}$, and $d_2$ denotes the distance between the end faces $200a_{2e}$ and $200b_{2e}$. In the first portions $200a_1$ and $200b_1$, the end faces $200a_{1e}$ and $200b_{1e}$ are nearly parallel to each other in the Z-axis direction and the distance $d_1$ is an approximately constant value. In the second portions $200a_2$ and $200b_2$, the end faces $200a_{2e}$ and $200b_{2e}$ are inclined in the Z-axis direction. Consequently, as they goes progressively to the higher position in Z-axis direction (they are progressively distant from the first portions $200a_1$ and $200b_1$, respectively), the distance $d_2$ is longer. The distance $d_1$ is set at a value larger than and close to the outside diameter of the portion of the cam pin 7 sandwiched in between the first portions $200a_1$ and $200b_1$. Similarly the distance $d_2$ is set at a value much larger than the diameter of the portion of the cam pin sandwiched in between the second portions $200a_2$ and $200b_2$. One or both of the end faces $200a_{2e}$ and $200b_{2e}$ may be a straight plane-like or curved inclined surface. Further, the inclined surfaces of both end faces may be equal to or different from each other in the angle of inclination and curvature.

Figure 5A:
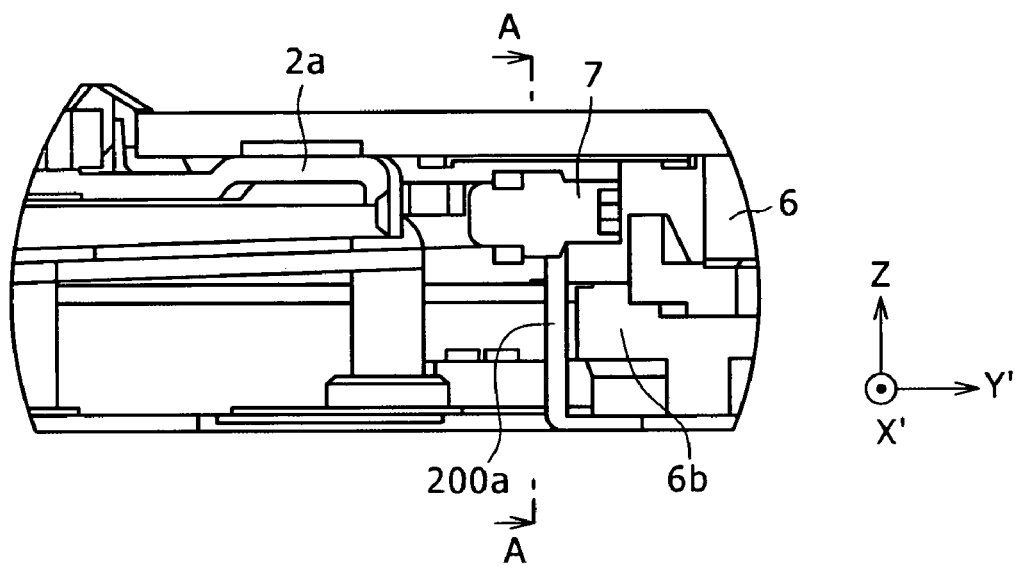
FIGS. 5A and 5B are sectional views of a raising/lowering mechanism in the optical disc apparatus of FIG. 1, showing a raised state of a unit mechanism portion for chucking a disc.
Figure 5B:
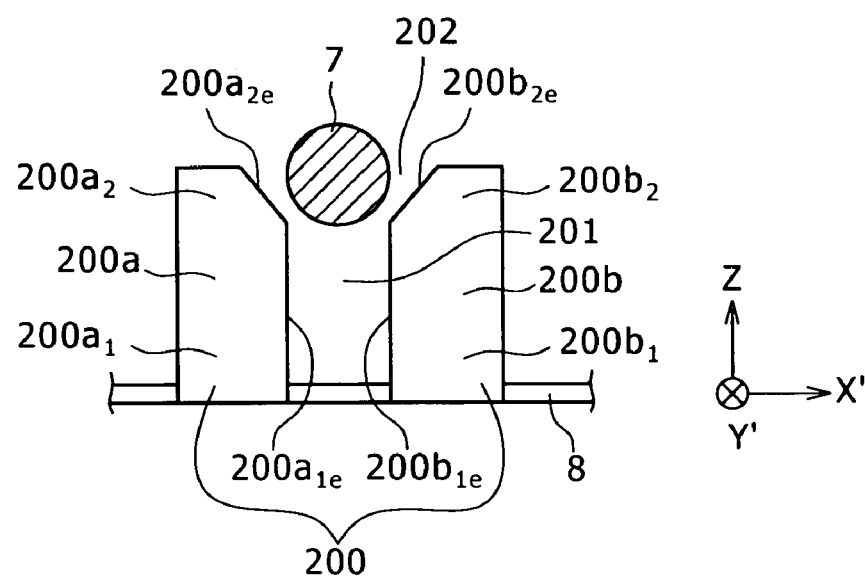
Figure 6A:
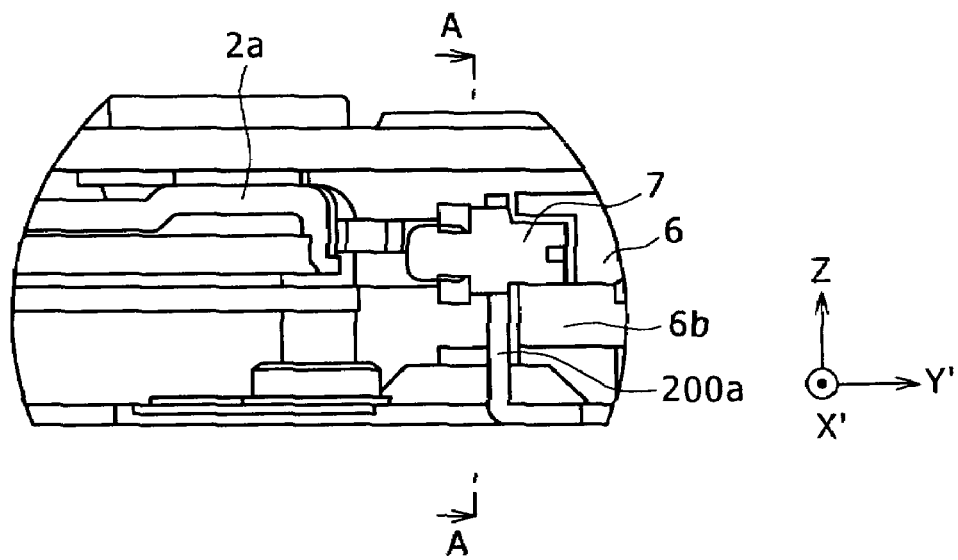
FIGS. 6A and 6B are sectional views of the raising/lowering mechanism in the optical disc apparatus of FIG. 1, showing a lowered state of the unit mechanism portion to a position permitting write or read.
Figure 6B:
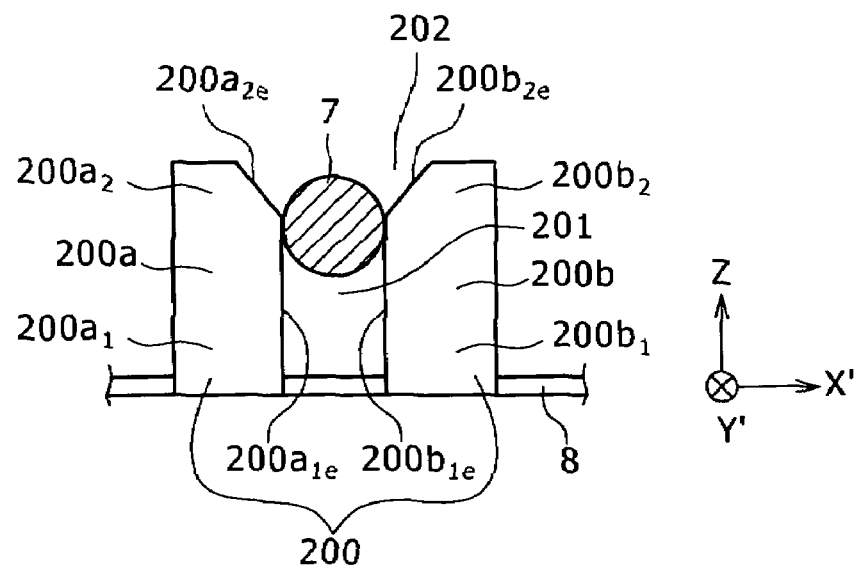

FIGS. 5A, 5B, 6A and 6B are sectional views of the raising/lowering mechanism used in the optical disc apparatus of FIG. 1. FIGS. 5A and 5B illustrate a state in which the unit mechanism portion is in its raised position for chucking the disc. FIGS. 6A and 6B illustrate a state in which the unit mechanism portion is in its lowered position permitting write or read operation. More specifically, FIGS. 5A and 6A each illustrate a cross-section in the Z-axis direction taken along a straight line passing through the pivotal center of the cam mechanism 6 (the center of the pivot shaft 6c) and further through the axis of the cam pin 7 (the axis in the Y'-axis direction). FIGS. 5B and 6B illustrate a section of the portion A-A in the X'-axis direction in FIGS. 5A and 6A, respectively.

When the optical disc is loaded into the body of the optical disc apparatus 100 and chucked onto the turntable 2a, the cam mechanism 6 pivoted by the driving gear 9 causes the cam pin 7 to move upward in Z-axis direction along the cam surface up to the height position of the space between the second portions $200a_2$ and $200b_2$ of the lugs 200a and 200b of the position restricting lugs 200, i.e., a space 202 between the end face $200a_{2e}$ of the second portion $200a_2$ and the end face $200b_{2e}$ of the second portion $200b_2$, from the height position of the space between the first portions $200a_1$ and $200b_1$, i.e., a space 201 between the end face $200a_{1e}$ of the first portion $200a_1$ and the end face $200b_{1e}$ of the first portion $200b_1$, (FIGS. 5A and 5B). In the state of FIG. 5, since the cam pin 7 lies within the space 202, the position restriction in the disc plane direction by the second portions $200a_2$ and $200b_2$ of the position restricting lugs 200 is cancelled or eased. In the operation range after the start of chucking of the optical disc onto the turntable 2a until the end of the chucking, the cam pin 7 lies within the space 202, so that the position restriction in the disc plane direction by the position restricting lugs 200 is in a cancelled or eased state. Therefore, when chucking of the optical disc onto the turntable 2a is started, the position restriction in the disc plane direction for the turntable 2a on the unit mechanism deck member 5a with the cam pin 7 fixed thereto is also cancelled or eased and is brought into a state corresponding to a high degree of freedom of movement in the disc plane direction. Thus, even if the axis of the turntable 2a is offset from the central position of the center hole of the optical disc, it is displaced so as to become nearly coincident with the center of the disc center hole, thereby permitting the execution of the normal disc chucking operation.

After the end of the chucking operation, the cam pin 7 lowers in the Z-axis direction along the cam surface of the cam mechanism 6 and stops at a predetermined height position which permits write or read operation of the optical disc apparatus. That is, the cam pin 7 assumes a lowered state (FIGS. 6A and 6B) to a predetermined height position (a height position permitting write or read operation of the optical disc apparatus) within the space 201 between the first portions $200a_1$ and $200b_1$ of the lugs 200a and 200b of the position restricting lugs 200 from its height position within the space 202 between the second portions $200a_2$ and $200b_2$. At the height position within the space 201 the cam pin 7, together with the unit mechanism portion including the unit mechanism deck member 5a, is positionally restricted in the disc plane direction by the lugs 200a and 200b of the position restricting lugs 200 and is held in its normal position.

According to the above embodiment the optical disc can be chucked positively onto the turntable and it becomes possible to improve the reliability of chucking. Besides, in the lugs 200a and 200b of the position restricting lugs 200, the end faces $200a_{2e}$, and $200b_{2e}$ of the second portions $200a_2$ and $200b_2$ are inclined in the Z-axis direction. Therefore, when the cam pin 7 moves from within the space 202 between the second portions $200a_2$ and $200b_2$ of the lugs 200a and 200b to the interior of the space 201 between the first portions $200a_1$ and $200b_1$ for performing write or read operation after chucking, the moving motion can be done smoothly.

Although the position restricting component used in the above embodiment comprises the plate-like position restricting lugs 200 formed integrally with the bottom case 8, the present invention is not limited thereto, but the position restriction means may be in a non-plate-like shape, e.g., a columnar shape. The position restricting component may be separate from the bottom case and may be fixed to the bottom case 8, chassis 4 or cam mechanism 6. Moreover, the position restricting component may be integral with the chassis 4 or the cam mechanism 6.

Further, although in the above embodiment the raising/lowering mechanism for pivoting and raising and lowering the unit mechanism deck member 5a includes the cam mechanism 6 and the cam pin 7, the present invention is not limited thereto, but there may be used any other means insofar as the means used can afford an equal or more outstanding function and effect in comparison with such construction of the raising/lowering mechanism.

The present invention can be carried out also in other modes than the above embodiment without departing from the spirit or principal features of the invention. Therefore, the above embodiment, in all of the points described above, is a mere illustration of the present invention and should not be understood limitatively. The scope of the present invention is shown by the following claims. Further, modifications and changes falling under an equivalent scope of the following claims are all included within the scope of the present invention.

What is claimed is:

1. An optical disc apparatus for performing write or read of information in a changed state of a height position of a disc plane after chucking of an optical disc onto a turntable, said optical disc apparatus comprising:

a first base which serves as a base of said optical disc apparatus;

a second base which is pivotable about a fulcrum with respect to said first base, and on which a disc motor for driving said turntable rotationally is mounted;

a cam mechanism which is provided pivotably on said first base side, and has a cam surface formed around a pivot shaft which extends in substantially the same direction as a rotary shaft of said disc motor;

a cam pin which is provided on said second base side and engages the cam surface of said cam mechanism;

a cam drive section which drives said cam mechanism rotationally; and position restricting component which restricts the position of said cam pin in the disc plane direction when said second base is at a first height position for write or read of information to or from said optical disc and cancels the position restriction of said cam pin in the disc plane direction when said second base is at a second height position which corresponds to a chucked position of said optical disc onto said turntable.

2. The optical disc apparatus according to claim 1, wherein, said position restricting component includes a first portion that restricts the position of said cam pin in the disc plane direction when said second base is at a first height position for write or read of information to or from said optical disc and a second portion that cancels the position restriction on said cam pin in the disc plane direction or makes the position restriction easier than in said first portion when said second base is at a second height position corresponding to a chucked position of the optical disc onto said turntable, and said position restricting component makes said turntable displaceable in the disc plane direction and makes the axis of said turntable nearly coincident with the center of a center hole formed in the optical disc when said cam pin causes said second base to move to said second height position in response to a change in height position of the cam surface caused by pivoting of said cam mechanism.

3. The optical disc apparatus according to claim 2, wherein said position restricting component is formed as a pair of lugs adapted to sandwich the outer periphery of said cam pin therebetween, and the spacing between said lugs in said second portion is wider than in said first portion.

4. The optical disc apparatus according to claim 2, wherein said position restricting component is formed as a pair of lugs adapted to sandwich the outer periphery of said cam pin therebetween, and the spacing between said lugs in said second portion becomes gradually wider with separation from said first portion.

5. The optical disc apparatus according to claim 1, wherein said cam pin is disposed on a straight line joining a pivotal axis of said cam mechanism and said second base, and said position restricting component is disposed between said cam mechanism and said second base.

6. An optical disc apparatus for performing write or read of information in a changed state of a height position of a disc plane after chucking of an optical disc onto a turntable, said optical disc apparatus comprising:

a first base which serves as a base of said optical disc apparatus;

a second base which is pivotable about a fulcrum with respect to said first base, and on which a disc motor for driving said turntable rotationally is mounted; and a position restricting component which restricts the position of said cam pin in the disc plane direction when said second base is at a first height position for write or read of information to or from said optical disc and cancels the position restriction of said second base in the disc plane direction when said second base is at a second height position which corresponds to a chucked position of said optical disc onto said turntable.

7. The optical disc apparatus according to claim 6, wherein when said second base moves to said second height position, said position restricting component makes said turntable displaceable in the disc plane direction and makes the axis of said turntable nearly coincident with the center of a center hole formed in said optical disc.

8. The optical disc apparatus according to claim 1, wherein said position restricting component is formed in the shape of a lug on a bottom case which covers a back side of said optical disc apparatus.

9. The optical disc apparatus according to claim 6, wherein said position restricting component is formed in the shape of a lug on a bottom case which covers a back side of said optical disc apparatus.

10. The optical disc apparatus according to claim 1, wherein said optical disc apparatus has a thickness of not larger than $9.5 \times 10^{-3}$ m.

11. The optical disc apparatus according to claim 6, wherein said optical disc apparatus has a thickness of not larger than $9.5 \times 10^{-3}$ m.

* * * * *